(No Model.)

L. AMES, Jr.
COUPLING FOR VEHICLE AXLES.

No. 396,641. Patented Jan. 22, 1889.

WITNESSES:
C. L. Bendison
J. J. Laass

INVENTOR,
Leonard Ames Jr.
BY
Duell, Laass & Duell
ATTORNEYS

N. PETERS, Photo-Lithographer, Washington, D. C.

UNITED STATES PATENT OFFICE.

LEONARD AMES, JR., OF OSWEGO, NEW YORK.

COUPLING FOR VEHICLE-AXLES.

SPECIFICATION forming part of Letters Patent No. 396,641, dated January 22, 1889.

Application filed September 6, 1888. Serial No. 284,688. (No model.)

*To all whom it may concern:*

Be it known that I, LEONARD AMES, Jr., of Oswego, in the county of Oswego, in the State of New York, have invented new and useful Improvements in Ball-and-Socket Couplings for Vehicle-Axles, of which the following, taken in connection with the accompanying drawings, is a full, clear, and exact description.

This invention relates to ball-and-socket couplings designed to be used in lieu of king-bolts for pivoting the forward or steering axles to the bodies of vehicles; and the invention consists in an improved construction and combination of parts constituting a ball-and-socket coupling which is stronger, more secure, and at the same time simpler and less expensive to manufacture than other analogous couplings hitherto devised.

The invention is fully illustrated in the annexed drawings, in which—

Figure 1:
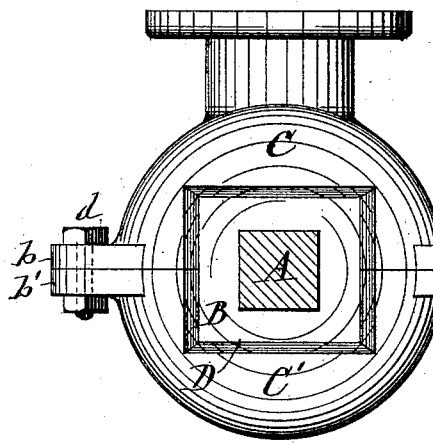
Figure 2:
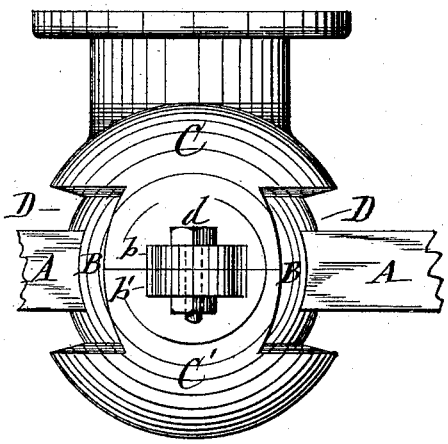
Figure 3:
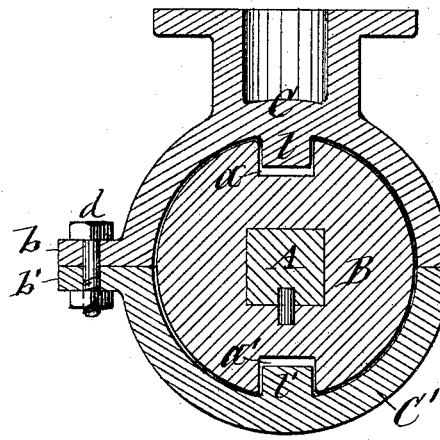
Figure 4:
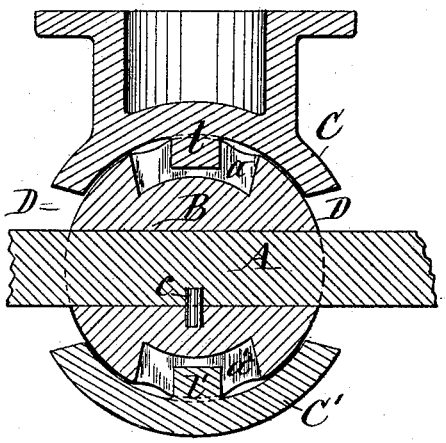
Figure 5:
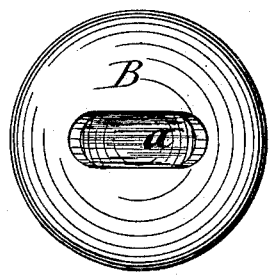

Figures 1 and 2 are views of my improved ball-and-socket coupling, taken, respectively, in directions endwise of the axle and sidewise of the same. Figs. 3 and 4 are vertical transverse sections taken, respectively, in planes at right angles to the axle and parallel with the axle; and Fig. 5 is a detached top view of the ball.

Similar letters of reference indicate corresponding parts.

A denotes the axle, and B represents the ball, which I secure rigidly to the axle by attaching to the latter a dowel-pin, $c$, which projects laterally from the axle, and then placing that portion of the axle containing the dowel-pin $c$ into a mold prepared for the purpose and casting the ball around said portion of the axle, the axle being so arranged in the mold as to cause the axle to pass diametrically through the ball and the dowel-pin $c$ to be inclosed in the ball. The ball B, I form with a socket, $a$, in its top, and preferably, also, with a socket, $a'$, in its bottom, which sockets are elongated in the direction lengthwise of the axle.

C denotes the saddle, formed with a semi-spherical bearing, by which it rides on top of the ball B and supports the body of the vehicle, (not shown in the annexed drawings,) and C' is a clip embracing the bottom portion of the ball B and secured to the saddle by bolts $d$ $d$, passing through perforated ears $b$ $b'$ on the saddle and clip. The interiors of the said saddle and clip when united form a spherical socket which closely envelops the ball. The sides of said socket through which the axle projects are formed with openings D D, sufficiently larger than the axle to allow the latter the necessary freedom to rock. The saddle C and clip C' have rigidly projecting from their concave sides, respectively, lugs $l$ and $l'$, which I cast thereon or form integral therewith, and thus simplify and cheapen the cost of manufacture and insure the rigidity of said lugs. The lug $l$, projecting into the socket $a$, and the other lug, $l'$, projecting into the socket $a'$, afford a perfectly secure hold of the socket on the ball and equalize the strain above and below the axle. The elongation of the sockets allows the necessary vertical oscillation of the axle.

Having described my invention, what I claim as new, and desire to secure by Letters Patent, is—

1. The saddle C and lug $l$, cast in one piece, in combination with the axle A, ball B, rigidly secured to the axle, and the clip C', embracing the lower portion of the axle and connected to the saddle, substantially as described and shown.

2. In combination with the axle A, the ball B, formed with sockets $a$ $a'$, respectively, in its top and bottom, the saddle C and lug $l$, cast in one piece, and the clip C' and lug $l'$, cast in one piece, substantially as described and shown.

3. In combination with the saddle C, clip C', and axle A, the dowel-pin $c$, secured to the axle, and the ball B, cast around the portion of the axle containing the dowel-pin, substantially as set forth.

4. The combination of the axle A, dowel-pin $c$, secured thereto, the ball B, cast around the axle and inclosing the dowel-pin, and formed with the elongated sockets $a$ $a'$, respectively, in its top and bottom, and the saddle C and clip C', having integral with them, respectively, the lugs $l$ and $l'$, projecting into the sockets $a$ $a'$, substantially as described and shown.

In testimony whereof I have hereunto signed my name, in the presence of two witnesses, at Oswego, in the county of Oswego, in the State of New York, this 4th day of September, 1888.

LEONARD AMES, JR. [L. S.]

Witnesses:
T. H. WEBB,
H. P. PENFIELD.